United States Patent [19]

Taylor

[11] Patent Number: 5,046,901
[45] Date of Patent: Sep. 10, 1991

[54] FLUSH BOLT BORING JIG

[76] Inventor: Richard Taylor, 2135 W. Jefferson Blvd., Los Angeles, Calif. 90018

[21] Appl. No.: 509,883

[22] Filed: Apr. 16, 1990

[51] Int. Cl.$^5$ .............................................. B23B 45/14
[52] U.S. Cl. .................................. 408/110; 408/108; 408/109
[58] Field of Search .............. 408/712, 115 R, 115 B, 408/110-112, 103-106, 100, 88, 97, 96, 88, 99, 135, 114, 234, 109, 107, 108; 33/644, 645, 642, 675, 197; 144/104.70, 82, 83

[56] References Cited

U.S. PATENT DOCUMENTS

| | | | |
|---|---|---|---|
| 17,017 | 4/1857 | Bosenbury | 408/111 |
| 165,681 | 7/1875 | Moyer | 408/108 X |
| 290,339 | 12/1883 | McDaniel | 408/88 |
| 544,402 | 8/1895 | Crane | 408/88 X |
| 661,135 | 11/1900 | Andrews | 144/70 |
| 1,317,285 | 9/1919 | Glaude | 408/97 |
| 2,416,912 | 3/1947 | De Curtis | 408/103 |
| 2,463,266 | 3/1949 | Habenicht | 408/712 X |
| 2,888,965 | 6/1959 | Phillips | 408/712 X |
| 3,362,447 | 1/1968 | Elder, Jr. | 408/112 X |
| 3,762,829 | 10/1973 | Yilmaz | 408/105 |
| 3,967,687 | 7/1976 | Fowler | 408/112 X |
| 4,031,931 | 6/1977 | Balcombe | 144/70 |
| 4,235,565 | 11/1980 | Albano | 408/99 |

Primary Examiner—Larry I. Schwartz
Assistant Examiner—Robert Schultz
Attorney, Agent, or Firm—Julius Rubinstein

[57] ABSTRACT

A flush bolt boring jig is rigidly attached to a drill. The drill has a bit which is the length of the bore to be formed in the door. The jig holds the drill rigidly so the bore being drilled in the door is parallel to the free end of the door. This is done by tracks mounted by clamps in such a way that the tracks are parallel to the free end of the door. The jig is attached to a pair of slide tubes which slide on the tracks. Since the drill is attached to the jig, as the hole in the door deepens, the drill moving with the slide tubes over the tracks moves in a straight line so that the bore being formed is exactly parallel to the free end of the door.

8 Claims, 2 Drawing Sheets

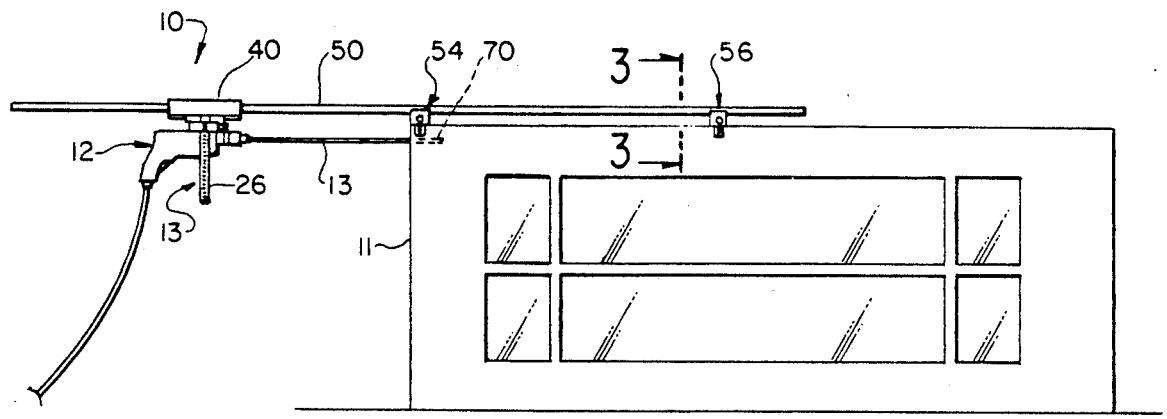
FIG. 1.
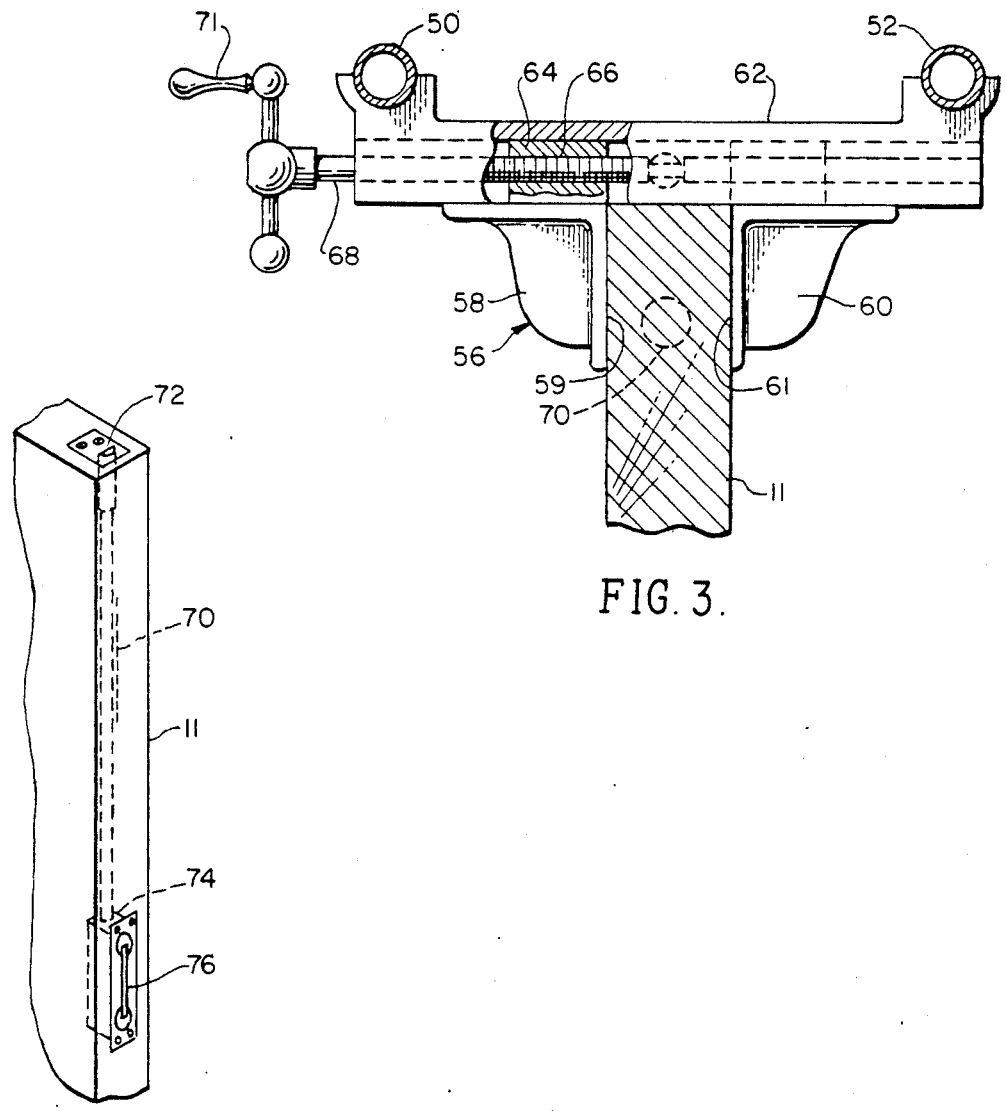
FIG. 3.
FIG. 2.

FLUSH BOLT BORING JIG

This invention relates to an apparatus for drilling a bore in a door from the top edge of the door parallel to the free swinging edge of the door down to the mortise cavity.

BACKGROUND OF THE INVENTION

Heretofore, as exemplified by the patent to Rowlings No. 4,204,785, jigs have been attached to hand power drills so that bores can be drilled through doors parallel to the edges of the door so that a slide bolt can be inserted through the bore to a mortise cavity formed at a suitable place in the edge of the door. The mortise cavity will have a mechanism installed therein which will raise a slide bolt in the door causing it to enter a slide bolt receiving hole in the door jamb thus locking the door. This arrangement is particularly suitable for double door structures whereby one door (controlled by the slide bolt) can be locked, and the adjacent door remains unlocked.

There is not much difficulty in using a drill for boring a hole in any part of a door. But the problem is much more difficult when the bore hole is long and the bore must be exactly parallel to the free swinging edge of the door where the bore hole diameter is not much smaller than the thickness of the door. Consequently, if the bore hole is not precisely parallel to the free swinging edge of the door the bore hole will not reach the mortise cavity but instead will exit the free swinging edge of the door at the wrong place.

BRIEF DESCRIPTION OF THE INVENTION

The invention comprises a jig in combination with a pair of spaced parallel tracks clamped to a door so they are spaced from and parallel to the free swinging edge of the door. The jig comprises a pair of integral spaced parallel slide tubes concentric with and movably mounted on said tracks. A drill is clamped to the jig and when a bit is inserted in the drill, the drill is positioned by the jig to form the above described bore. The jig is provided with means for adjusting the position of the drill on the jig, so the position of the bore in the door can be varied.

In operation, when the drill is working, as the bore hole deepens, the jig which is integral with the spaced parallel slide tubes riding on the tracks moves with the drill.

The use of the spaced parallel slide tubes riding on the spaced parallel tracks, which are clamped to the door so they are parallel to and spaced from the free swinging edge of the door is very important because it keeps the drill and the drill bit precisely parallel to the free swinging edge of the door. If the jig was riding on a single track, the bore being drilled might not be sufficiently parallel to the free swinging edge of the door.

What is needed therefore and comprises the principal object of this invention is to provide a jig which holds a drill in such a position that the drill bit forms a bore which extends downward to the mortise cavity and is precisely parallel to the free swinging edge of the door.

The and other objects of this invention will become more apparent when better understood in the light of the accompanying specification and drawings wherein:

FIG. 1 is a side elevational view of a door, showing a drill attached to the flush bolt boring jig in proper alignment for boring into the edge of the door.

FIG. 2 discloses a fragmentary perspective view showing the flush bolt mechanism as installed in the edge of a door.

FIG. 3 is a cross sectional view taken on the line 3—3 of FIG. 1 showing the clamping mechanism for holding the boring jig on the edge of a door.

Figure 4:
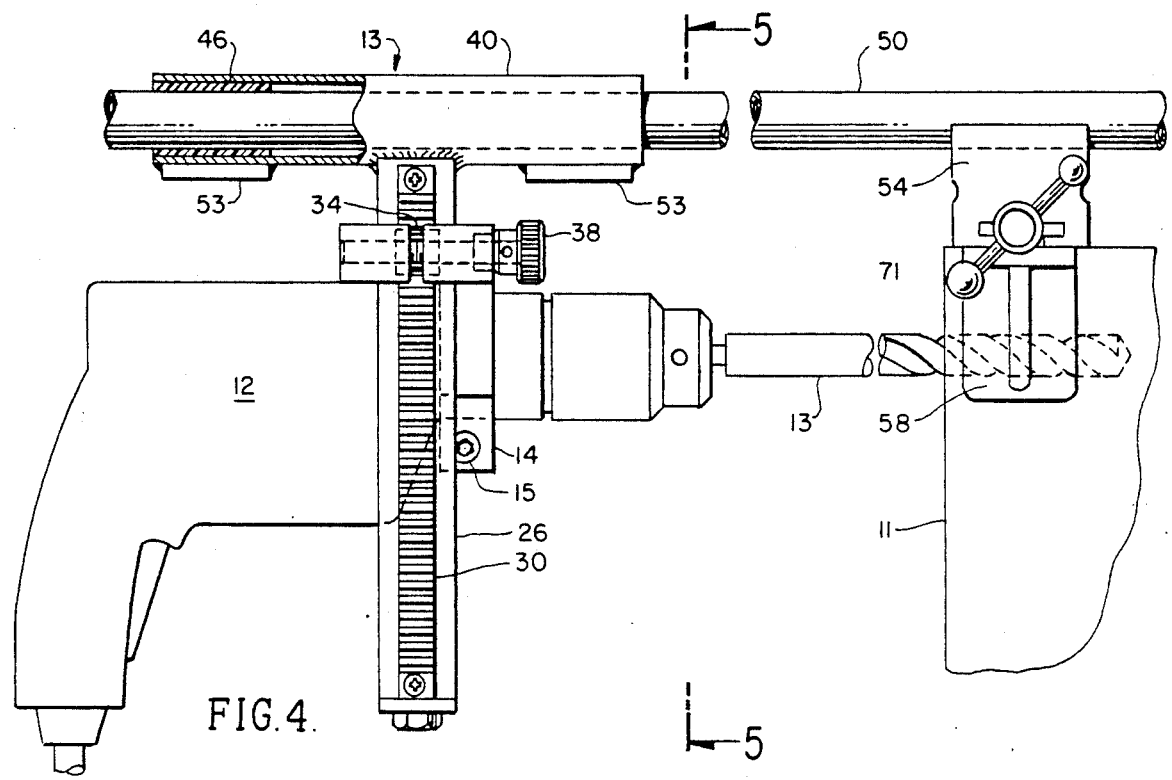
FIG. 4 is an enlarged side elevational view of the flush bolt boring jig shown in FIG. 1.

Referring now to FIG. 1 of the drawing, apparatus 5 for drilling an elongated bore 70 in a door from the top edge 11 of the door, close the to the free swinging edge of the door comprises in combination a jig 10 and a pair of cylindrical tubes or tracks 50 and 52 clamped to the free swinging edge of the door by a pair of door clamps 54 and 56 see FIGS. 4. The door clamps 52 and 54 are shaped so the tracks are spaced from the free swinging edge of the door to provide room for the jig and the drill and the gear racks 30 and 32. The length of the tracks is substantially equal to the length of the door, see FIG. 1.

The jig includes pair of integrally attached spaced parallel slide tubes 40 and 42 which are concentric with the tracks 50 and 52 and are slidable over them, see FIG. 4. A drill 12 is clamped to the jig 10 by means of a drill clamp 14. The drill clamp has a circular opening 17 sized to receive the body of the drill 12, see FIG. 5. The circular opening 17 is split at the bottom defining integral depending fingers 19 and 21. These fingers are provided with threaded aligned bores 23 and 25 through which the clamping bolt 15 extends. In this way, by tightening the clamping bolt 15, the diameter of the circular opening 17 decreases and tightly embraces the body of the drill 12 holding it steady on the jig 10.

Figure 5:
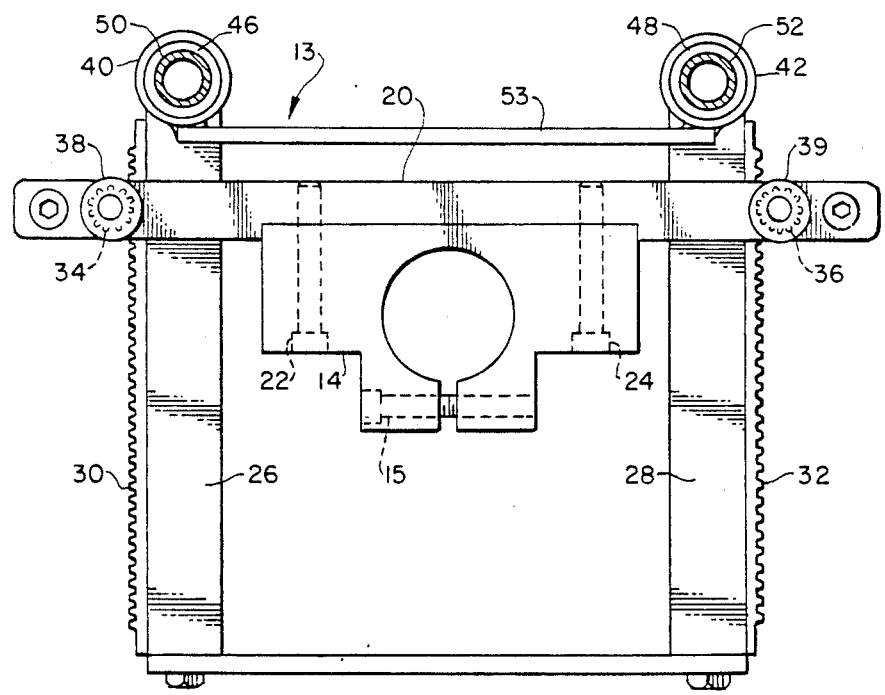
FIG. 5 is a sectional view taken on line 5—5 of FIG. 4.

The drill clamp 14 shown in FIG. 5 is attached to a horizontal bar 20 by means of set screws 22 and 24 situated at opposite ends of the clamp. The ends of the horizontal bar are connected to elongated vertical supports 26 and 28. The outer edges of these elongated supports 26 and 28 have gear racks 30 and 32 formed thereon. A pair of pinion gears 34 and 36 engage the gear racks 30 and 32 and are operated by knurled knobs 38 and 40. In this way by manually rotating the knurled knobs, the drill 12 with its elongated bit 13 can be precisely moved on the jig, thereby varying the position of bore in the door. As shown in FIG. 4, the jig is designed so the drill 12 with its bit 13 are rigidly clamped to the jig so the bored hole 70 will be parallel to the edge of the door.

The upper ends of the elongated vertical supports 26 and 28 are held in spaced parallel relationship by a spacing rod 53 and are secured by any suitable means such as by welding to the above described pair of slide tubes 40 and 42 riding on tracks 50 and 52. A pair of nylon bushings 46 and 48 are interposed between the slide tubes 40 and 42 and the spaced parallel tracks 50 and 52 so that the jig 10 holding the drill 12 can slide easily on the tracks as the bore increases in depth.

Referring to FIG. 3, as stated above, the tracks 50 and 52 are maintained precisely parallel to each other and at the same distance from the edge of the door by a pair of clamps door 54 and 56, see FIG. 4. The clamps are spaced sufficiently far apart, as shown in FIG. 1, to make certain that the tracks 50 and 52 are held parallel to each other and to the edge of the door and thus guiding the drill bit through the bore inside the door.

The clamps 54 and 56 each have vise jaws 58 and 60 slidably mounted in a bracket 62 see FIG. 3. A threaded bore 66 is formed in the integral slide block 64 of the vise jaw 58 and slide blocks 65 of jaw 60. The planar work contacting surfaces 59 and 61 of the vise jaws 58 and 60 engage the opposite sides of the door 11 as the vise jaws move toward each other see FIG. 3. A threaded screw shaft 68 turned by means of a handle 71 has right and left hand threads on either end engaged in threaded slide blocks 64 and 65. Thus moving the jaws 58 and 60 simultaneously toward or away from each other when the handle 71 is turned. As seen in FIG. 1, the pair of door clamps 54 and 56 are attached to the edge of the door 11 in vertically spaced relation to each other. This as stated above, keeps the alignment bars parallel to the edge of the door, along the length of the bore and at the same distance from the edge of the bore.

Referring now to FIG. 2, after the bore 70 is completed, the slide bolt 72 mechanism is inserted in the door. A mortise cavity 74 is formed in the edge of the door where the slide bolt mechanism is positioned and attached. When the assembly is completed, the lever arm 76 see FIG. 2 is lifted to raise the slide bolt 72 into a bolt receiving hole at the top of the door jamb, thus locking the door.

Having described the invention what I claim as new is:

1. An apparatus for drilling a bore in the top edge of a door closely parallel to the side edge of the door comprising in combination, a jig and a pair of separate spaced parallel tracks extending parallel to the side edge of the door, a pair of vertically spaced door clamps clamped to the side of the door for holding said tracks to said door, formations on each of said vertically spaced door clamps extending parallel to the side edge of the door and shaped to receive said pair of spaced parallel tracks for holding them in spaced parallel relationship to each other and to the side edge of the door, said jig including a pair of attached spaced parallel slide tubes, said slide tubes spaced apart the same distance as said tracks and mounted over said tracks in concentric relationship with said tracks and in such a way that said slide tubes with said attached jig can be slid over said tracks, a drill clamp mounted in said jig, a drill and a drill bit mounted on said drill clamp whereby said drill is attached to said jig so as the drill moves with the jig along the tracks, the bit of the drill forms a straight bore of desired length which is precisely parallel to the side edge of the door, and means on said jig for adjusting the position of the drill and the drill bit with respect to the bore so the position of the bore in the door can be varied.

2. The apparatus for drilling a bore in a door as described in claim 1 wherein said formations in said door clamps comprise spaced parallel semi-circular recesses formed in the door clamps for receiving said tracks and holding them in spaced parallel relationship to each other and to the side edge of the door.

3. A jig and a drill clamp in said jig, said drill clamp in said jig including a support, a circular opening in the support the diameter of which is substantially equal to the diameter of the body of the drill, the bottom of said circular opening split defining thereby a pair of depending fingers, aligned bolt receiving bores extending through said depending fingers, a clamping bolt extending through said aligned bores in said depending fingers to decrease the diameter of said circular opening so that the drill clamp tightly embraces the body of the drill to rigidly hold a drill to the said drill clamp in said jig, a horizontal bar, set screws extending through the opposite sides of said drill clamp extending into said horizontal bar to rigidly hold the drill clamp to the horizontal bar, said horizontal bar having opposed ends, vertical support bars secured to the said ends of the horizontal bar, rack gears formed on the outwardly facing edges of the support bars, pinion gears formed on the ends of the horizontal bar in engagement with the rack gears, means for rotating said pinion gears so that when the pinion gears are rotated, the horizontal support bar rigid with the drill clamp moves up or down the rack gears whereby the position of a drill in the drill clamp can be varied.

4. The apparatus described in claim 3 including a spacing bar, said spacing bar attached to the tops of said vertical support bars to hold them parallel to each other, said spacing bar secured to a pair of spaced parallel slide tubes.

5. An apparatus for drilling a bore in the top edge of a door closely parallel to the side edge of the door comprising in combination, a jig and a pair of separate spaced parallel tracks extending parallel to the side edge of the door, a pair of vertically spaced door clamps for holding said tracks to said door, formations on each of said vertically spaced door clamps extending parallel to the edge of the door and shaped to receive said pair of spaced parallel tracks for holding them in spaced parallel relationship to each other and to the side edge of the door, each of said door clamps having spaced door engaging surfaces, adjustable means on said clamps for moving said spaced door engaging surfaces into engagement with the opposite side surfaces of the door whereby the door clamps can be rigidly secured to said door, said jig including a pair of attached spaced parallel slide tubes, said slide tubes spaced apart the same distance as said tracks and mounted over said tracks in concentric relationship with said tracks and in such a way that said slide tubes with said attached jig can be slid over said tracks, a drill clamp mounted in said jig, a drill and a drill bit, said drill and said bit mounted in said drill clamp whereby said drill is attached to said jig so that the drill moves with the jig along the tracks, the bit of the drill operating to form a straight bore of desired length which is precisely parallel to the side edge of the door, and means on said jig for adjusting the position of the drill and the drill bit with respect to the bore so the position of the bore in the door can be varied, said formations in said door clamps comprising spaced parallel semi-circular recesses formed in the door clamps for receiving said tracks and holding them in spaced parallel relationship to each other and to the side edge of the door, said drill clamp in said jig comprising a support, a circular opening in the support the diameter of which is substantially equal to the diameter of the body of the drill, the bottom of said circular opening split defining thereby a pair of depending fingers, aligned bolt receiving bores extending through said depending fingers, a clamping bolt extending through said aligned bores in said depending fingers to decrease the diamter of said circular opening so that the drill clamp tightly embraces the body of the drill to rigidly hold a drill to the said drill clamp in said jig, a horizontal bar, set screws extending through the opposite sides of said drill clamp extending into said horizontal bar to rigidly hold the drill clamp to the horizontal bar, said horizontal bar having opposed ends, vertical support bars secured to the said ends of the horizontal bar, rack gears formed on the outwardly facing edges of the support bars, pinion gears formed on the ends of the horizontal bar in engagement with the rack gears, means for rotating said pinion gears so that when the pinion gears are rotated, the horizontal support bar rigid with the drill clamp moves up or down the rack gears whereby the position of a drill in the drill clamp can be varied.

6. A jig and a drill clamp in said jig, said drill clamp in said jig including a support, a circular opening in the support the diameter of which is substantially equal to the diameter of the body of the drill, the bottom of said circular opening split defining thereby a pair of depending fingers, aligned bolt receiving bores extending through said depending fingers, a clamping bolt extending through said aligned bores in said depending fingers to decrease the diameter of said circular opening so that the drill clamp tightly embraces the body of the drill to rigidly hold a drill to the said drill clamp in said jig, a horizontal bar, set screws extending through the opposite sides of said drill clamp extending into said horizontal bar to rigidly hold the drill clamp to the horizontal bar, said horizontal bar having opposed ends, vertical support bars secured to the said ends of the horizontal bar, rack gears formed on the outwardly facing edges of the support bars, pinion gears formed on the ends of the horizontal bar in engagement with the rack gears, means for rotating said pinion gears so that when the pinion gears are rotated, the horizontal support bar rigid with the drill clamp moves up or down the rack gears whereby the position of a drill in the drill clamp can be varied.

7. The apparatus described in claim 6 including a spacing bar, said spacing bar attached to the tops of said vertical support bars to hold them parallel to each other, said spacing bar secured to a pair of spaced parallel slide tubes.

8. The apparatus described in claim 1 wherein said door clamps comprise a pair of clamping vise jaws, a threaded bore, extending through each clamp, a bolt with reverse threads at each end in threaded engagement with said bore, means for rotating said bolt whereby as the threaded bolt is turned, the vise jaws move toward each other to tightly embrace the opposite side surfaces of the door.

* * * * *